United States Patent

[11] 3,597,760

| [72] | Inventors | Harold L. Fox<br>Salt Lake City, Utah;<br>Lamont J. Seitz, Tujunga, Calif.; Gale H. Thorne, Salt Lake City, Utah |
|---|---|---|
| [21] | Appl. No. | 772,332 |
| [22] | Filed | Oct. 31, 1968 |
| [45] | Patented | Aug. 3, 1971 |
| [73] | Assignee | Baxter Laboratories, Inc.<br>Morton Grove, Ill. |

[54] DIFFERENTIAL DIGITAL CONVERTER
4 Claims, 2 Drawing Figs.

[52] U.S. Cl. .................................................. 340/347 AD,
235/92 NT
[51] Int. Cl. ............................................................ G06g 7/18

[50] Field of Search........................................... 340/347
AD, 146.2; 235/92 U, 150

[56] References Cited
UNITED STATES PATENTS
2,963,697  12/1960  Giel............................. 340/347

Primary Examiner—Thomas A. Robinson
Attorneys—Samuel B. Smith, Jr. and Richard J. Reilly

ABSTRACT: An electronic apparatus and system is described for use in conjunction with a spectrophotometer, and the like, and which is capable, for example, of directly reading the difference between two optical transmission readings of two successive test samples; or of converting the difference into a logarithmic scale, indicating the difference in optical densities of the two samples.

DIFFERENTIAL DIGITAL CONVERTER

BACKGROUND OF THE INVENTION

Electronic instruments are known which may be used in conjunction with spectrophotometers, and which are capable of providing optical transmission readings of a test sample; or of converting the readings into a logarithmic scale, so as to provide calibrated readings of the optical density of the sample. Such instruments and systems include circuitry for digitizing the optical transmission analog readings from the spectrophotometer and for converting the digitized readings into a logarithmic scale. They also include a simple counter/printer for counting the resulting pulses and for providing corresponding optical transmission or optical density readings of the test sample.

As is well known, spectrophotometric analysis is a method of chemical analysis based on the absorption of light of a particular wavelength by a particular impurity in the test sample. The instruments used for this purpose are known as spectrophotometers, and these instruments are capable, by selecting different wavelengths of light passing through the sample, of measuring the percent concentration of various known impurities in the sample.

A simple spectrophotometer comprises a source of light, together with some means for dispersing the light so that only a limited band is directed through the test sample; and a photodetector is also provided for producing an analog output signal having an amplitude indicative of the amount of light passed through the sample at the selected wavelength, the value represented by the analog signal being usually referred to as the "optical transmission" of the sample.

Although not limited to spectrophotometry, the instrument and system of the invention find particular utility when used in conjunction with spectrophotometers. The spectrophotometer, as explained, provides analog readings corresponding to the optical transmission of the test sample. These readings may be converted by the system of the present invention into a logarithmic scale, the resulting readings representing directly the difference in the "optical densities" of two samples. As is well known, the "optical density" of a sample has a direct relationship to the percent concentration of the impurity in the sample.

The aforesaid prior art instruments and systems provide a simple and relatively inexpensive means which are capable, for example, of responding to the analog optical transmission output of a spectrophotometer, and of converting that output into an optical density reading. In some tests, however, it is desirable to obtain a reading of the difference in the optical densities of two samples.

For example, in a glucose oxidase test, two samples of a particular serum are provided, with glucose oxidase being added to one but not to the other. The desired reaction is determined by finding the difference in the optical densities of the two samples. The difference in the optical densities could, of course, be obtained by testing one sample in the system of the invention to determine its optical density, and then by testing the other sample in the system to obtain its optical density, and by then subtracting one of the results from the other.

However, this is a somewhat laborious process, and the differential digital converter of the present invention serves to achieve the difference between the two readings directly, upon the successive testing of the two samples. The system to be described actually performs a subtraction of one logarithmic value from the other, so that the actual differences in optical densities, rather than in optical transmissions, may be derived directly, which is the desired end result. It will be appreciated, of course, that by using a linear, rather than a logarithmic scale, the system of the invention can be used to provide a direct reading of the difference in optical transmissions in the two samples.

The present system, in the embodiment to be described, serves to measure the optical transmissions of two test samples in sequence, and then automatically to provide a reading as to the difference in the optical densities of the two samples. This result is achieved by storing the optical transmission reading of the first sample, and then starting the count in the associated counter and printer only after the corresponding optical density reaction reaches the stored value; and then subsequently stopping the count by the counter and printer when the optical density reaction of the system reaches the optical transmission level of the second sample.

DETAILED DESCRIPTION OF THE ILLUSTRATED EMBODIMENT

Figure 1:
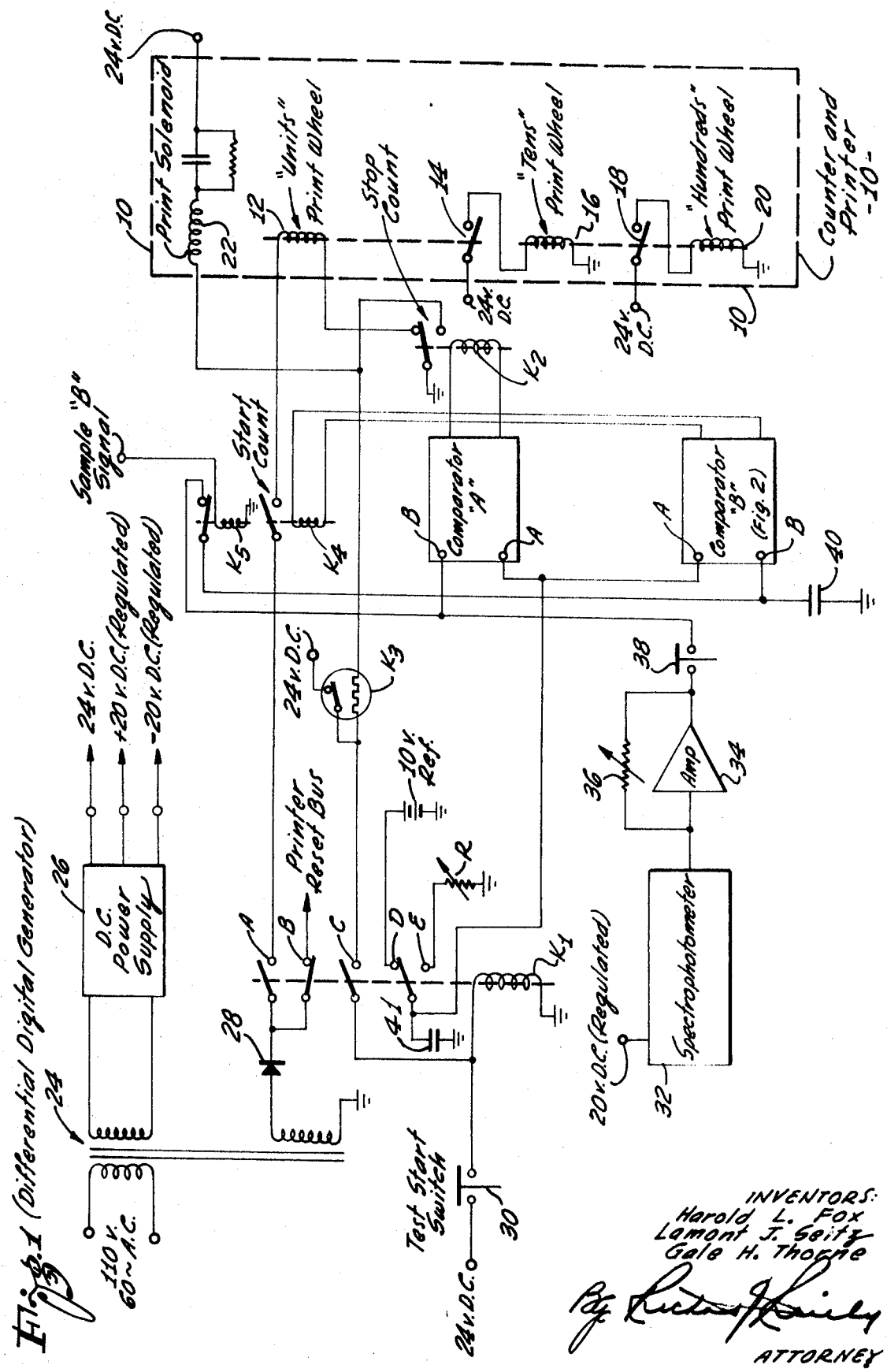
FIG. 1 is a diagram, partly in circuit form and partly in block form, illustrative of one embodiment of the system of the present invention.

The system of FIG. 1 includes, for example, a counter/printer unit which is designated as 10. This unit may be of the type manufactured and sold by the Presin Co., Inc. of Bridgeport, Connecticut. The counter/printer 10, for example, includes a solenoid coil 12 which responds to input pulses to turn a "units" print wheel from one angular position to another. When the "units" print wheel reaches the "10" position, a switch 14 in the unit is closed, and this activates a solenoid 16 which, in turn, turns the "tens" print wheel of the counter from one angular position to another. Likewise, when the "tens" print wheel reaches the "100" position, a switch 18 is closed which energizes a solenoid 20, and the latter solenoid, in turn, turns the "hundreds" print wheel of the counter from one position to another.

The counter/printer unit 10, therefore, serves to count incoming pulses, and to provide a total count for a series of the pulses by turning the "units," "tens" and "hundreds" print wheels to corresponding readings, under the control of the solenoid 12, 16 and 20. The counter/printer 10 also includes a print solenoid 22 which, when activated, causes the totals indicated by the angular positions of the print wheels to be printed on an appropriate tape. Suitable resetting means (not shown) is also provided which may be controlled to return all the print wheels to zero.

In the circuit of FIG. 1, a transformer 24 is provided which has a primary winding connected to the usual 110-volt, 60-cycle alternating-current main. A first secondary winding of the transformer 24 energizes a usual direct-current power supply 26. The power supply provides, for example, a 24-volt direct voltage at one output terminal, and positive and negative 20-volt direct current regulated voltages at other output terminals. Appropriate circuits for producing these voltages are well known to the art, and need not be shown in detail here.

A second secondary winding of the transformer 24 is connected through a diode rectifier 28, and through a pair of normally open contacts A of a relay K1 to the solenoid 12 of the "units" print wheel in the counter and printer 10. A normally open pair of contacts of a relay K4 are interposed in the circuit as shown. The diode rectifier 28 serves to digitize the alternating current appearing across the secondary winding of the transformer 24, and when the relays K1 and K4 are energized, these pulses are applied to the solenoid 12 to cause the "units" print wheel in the counter/printer 10 to turn from one position to the next for each successive pulse, and for a totalized count to be recorded in the counter and printer on the "units," "tens" and "hundreds" print wheels.

The pulses may also be applied through a pair of normally closed contacts B of the relay K1 to a printer reset bus in the counter and printer 10. When pulses are applied to the last-mentioned bus, the print wheels in the printer are all reset to zero. The relay K1 also includes a pair of normally open holding contacts C, which are connected to the coil and through the normally closed contacts of a thermal relay K3 to the 24 volt terminal of the power supply 26. The holding contacts are also connected through the thermal control element of the relay K3 to the print solenoid 22 of the counter/printer 10. A start switch 30 connects the coil of the relay K1 to the 24-volt terminal of the power supply 26.

The system of the present invention may be used in conjunction with a spectrophotometer, such as designated by the block 32 in FIG. 1, the spectrophotometer being connected to the 20-volt regulated output terminal of the power supply 26 to obtain its exciting potential. As mentioned above, the spectrophotometer 32 develops analog signals which represent the optical transmissions of the test samples. In this particular instance, and as explained, two successive samples are tested by the spectrophotometer, the difference in their optical transmissions is measured by the system, and in the illustrated embodiment are directly converted to the difference in optical densities of the two samples. A relay K5 is included in the system. This relay is deenergized for the first sample and is energized for the second sample. An appropriate switch, or other means, may be provided for this purpose.

The analog signal from the spectrophotometer is amplified in an amplifier 34, the amplifier being shunted by a potentiometer 36 which controls the amplitude of its output. The output of the amplifier is applied through a switch 38 to the input terminal "B" of a comparator "A," and through the normally closed contacts of the relay K5 to the input terminal "B" of a comparator "B." The circuitry of the comparator "B" will be described in more detail in FIG. 2. The comparator "A" may have a similar circuit.

A grounded capacitor 40 is connected to the input terminal "B" of the comparator "B," and it serves as an analog memory. A further capacitor 41 is connected to the input terminals "A" of the comparators "A" and "B." The capacitor 41 is also connected through a pair of normally closed contacts "D" of the relay K1 to a 10-volt reference source, and through a pair of normally open contacts "E" of the relay K1 to a grounded adjustable reference resistance "R." In the circuit of FIG. 1, the capacitor 41 is charged to the 10-volt reference level through the normally closed contacts "D" of the relay K1, when the relay is deenergized. Then, when the relay K1 is energized, the normally closed contacts "D" open, and the normally open contacts "E" close to permit the capacitor 41 to discharge through the resistor "R." This discharge, as is well known, is along an exponential path, so that the inputs applied to the terminals "A" of the comparators "A" and "B" have a logarithmic relationship with respect to time, as represented by the exponential curve. These elements combine to constitute a ramp generator for the comparators "A" and "B." It will be appreciated that any appropriate linear ramp generator may be used when the differential in optical transmissions of the two samples, rather than in optical densities is to be provided.

The system shown in FIG. 1 is first calibrated, by processing a "blank" sample, such as pure water with 100 percent optical transmission, by the spectrophotometer 32. During this test, the relay K5 is energized, so that the output from the amplifier 34, when the switch 38 is closed, is applied only to the comparator "A." The test start switch 30 is left open, so that the reference potential of 10 volts is applied to the input terminal "A" of the comparator "A." The switch 38 is closed and the gain of the amplifier 34 is adjusted, by adjusting the potentiometer 36, until the relay K2 is energized, indicating that the signal from the spectrophotometer 32 corresponds to the 10-volt reference level, and therefore calibrating a correspondence between the 100 percent transmission output of the spectrophotometer and the 10-volt reference. The gain of the amplifier 34 is then decreased slightly from that point, so that the comparator "A" is not quite tripped, and the relay K2 is deenergized.

A pair of standard samples, having a known difference in their optical densities is now tested. The first test sample is processed by the spectrophotometer, with the relay K5 deenergized, so that its contacts are closed. The closed contacts of the relay K5 cause the resulting signal from the spectrophotometer, as amplified by the amplifier 34, to be impressed across the capacitor 40 when the switch 38 is momentarily closed. The capacitor 40 then charges up to a level corresponding to the analog value representing the optical transmission of the first sample.

The second sample is then tested by the spectrophotometer 32, and the relay K5 is now energized to open its normally closed contacts. The switch 38 is now closed and the analog signal corresponding to the optical transmission of the second sample is therefore applied only to the input terminal "B" of the comparator "A." The start switch 30 is now closed momentarily to energize the relay K1. The relay K1 is held energized by the holding contacts "C." The contacts "D" now open and contacts "E" close so that the capacitor 41 begins to discharge along its exponential path through the resistor "R." The resulting exponentially decreasing voltage is applied to the input terminals "A" of the comparators "A" and "B."

When the exponentially decreasing voltage decreases to a point corresponding to the voltage across the capacitor 40, the comparator "B" energizes the relay K4 which, in turn, closes its normally open contacts to apply the pulses from the rectifier 28 to the counter/printer 10. The counter/printer 10 then begins to count in the manner described above, and the voltage from the capacitor 41 continues to decrease along its exponential curve. When the decrease reaches the level of the analog signal applied to the comparator "A," and which corresponds to the optical transmission of the second sample, the relay K2 is energized to stop the count. The normally open contacts associated with the relay K2 energize the thermal delay relay K3 and also serve to introduce a signal to the print solenoid 22 of the counter and printer 10, so that the total count may be printed. The relay K1 is deenergized a short time thereafter as the thermal delay relay K3 opens its contacts and breaks the circuit through the holding contacts "C" of the relay K1. The resulting closure of the contacts "B" of the relay K1 resets the counter/printer 10 to zero.

If the result represented by the counter/printer 10 is different from the known difference between the optical densities of the two standard samples, the value of the reference resistor "R" is changed, and the calibration test repeated until the proper value is given. The system of the invention is then calibrated, and can be used to measure the optical density differentials between pairs of test samples.

For each such test, the relay K5 is deenergized during the processing of the first sample, so that the memory capacitor 40 can be charged to an analog level representing the optical transmission of the first sample; and the relay K5 is energized during the processing of the second sample, so that an analog signal corresponding to the optical transmission of the second sample may be applied only to the comparator "A." Then, in the manner described above, the count does not begin by the counter 10 until the optical transmission level of the first sample is reached, and the count is then stopped when the optical transmission of the second sample is reached. The resulting reading by the counter 10 is the differential of the optical densities of the two samples.

Figure 2:
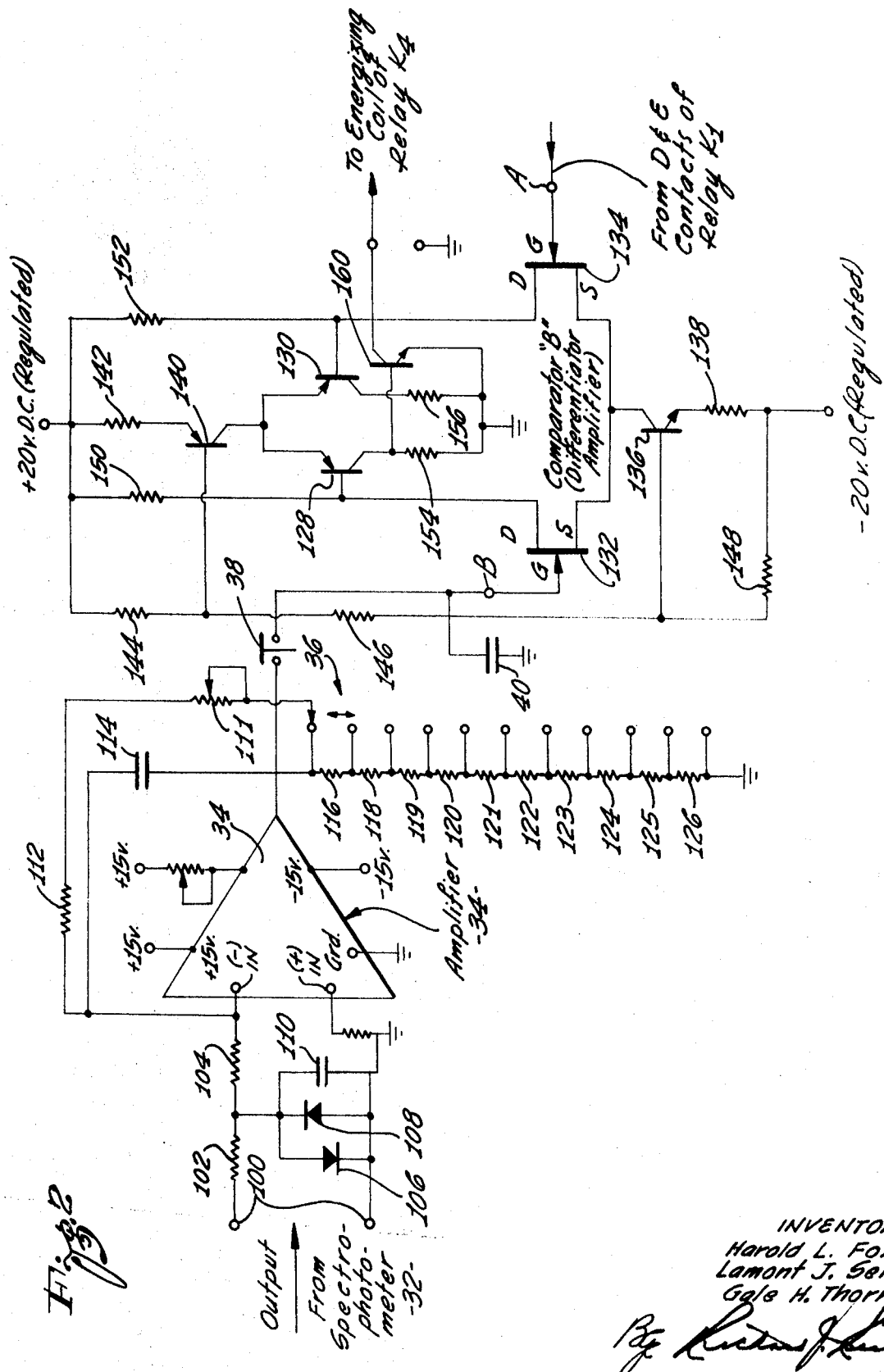
FIG. 2 is a circuit diagram, showing in more detail certain of the components of the diagram of FIG. 1.

Various components of the circuit of FIG. 1 are shown in more detail in FIG. 2. As shown in FIG. 2, for example, the amplifier 34 may be of the operational type. The output from the spectrophotometer 32 is applied to a pair of input terminals 100 of the amplifier, one of which is grounded. The ungrounded input terminal 100 of the amplifier is connected through a pair of resistors 102 and 104 to the negative input terminals of the operational amplifier 34. The resistor 102 may, for example, have a resistance of 2.2 kilohms and the resistor 104 may have a resistance of 8.3 kilohms.

The junction of the resistors 102 and 104 is connected to ground through a pair of back-to-back diodes 106 and 108, these being shunted by 5-microfarad capacitor 110. The resistors 102, 104 and the capacitor 110 form an appropriate 60-cycle filter, so that any 60-cycle interference is kept out of the amplifier circuit. The back-to-back diodes 106 and 108 prevent overload currents from reaching the amplifier 34 and damaging the amplifier.

The gain of the amplifier is set by the gain adjustment potentiometer control 36 described in FIG. 1. The potentiometer control 36 may include a fine potentiometer 111 which may have a resistance, for example, of 500 kilohms, and which is in series with a 1-megohm resistor 112. The input and output of the operational amplifier is shunted by a 0.002-microfarad capacitor 114. The potentiometer control 36 may also include a coarse gain adjustment for the amplifier which is provided, for example, by a series of resistors 116, 118, 119, 120, 121, 122, 123, 124, 125, 126, the latter resistor being grounded. These resistors are selectively switched into the circuit, as shown.

The resistor 116 may have a value, for example, of 1.5 kilohms; the resistor 118 a value of 1 kilohm; the resistor 119 a value of 680 ohms; the resistor 120 a value of 470 ohms; the resistor 121 a value of 330 ohms; the resistor 122 a value of 220 ohms; the resistor 134 a value of 160 ohms; the resistor 124 a value of 110 ohms; the resistor 124 a value of 75 ohms; and the resistor 126 a value of 160 ohms.

The output from the amplifier 34, as described in conjunction with the circuit of FIG. 1 is applied to the input terminal "B" of the comparator "B" when the switch 38 is closed, whereas the exponentially decreasing curve from the capacitor 41 of FIG. 1 is applied to the input terminal "A." Thus it is understood, although not shown for the sake of overcrowding the Figure, that the relay K5 is included in the circuit between the switch 38 and input terminal "B" of comparator "B."

The comparator "B" in the circuit of FIG. 2 takes the form of a differential amplifier made up of a pair of PNP transistors 128 and 130. The input terminal "B" of the comparator is connected to the gate of a field effect transistor 132, whereas the input terminal "A" of the comparator is connected to the gate of a field effect transistor 134. The source electrodes of the field effect transistors 132 and 134 are connected to the collector of a current stabilizing NPN transistor 136, the emitter of which is connected through a 3.8 kilohm resistor 138 to the output terminal of a negative 20-volt regulated direct voltage source. The emitters of the transistors 128 and 130 are connected to the collector of a current-stabilizing PNP transistor 140, the emitter of which is connected through a 2.7 kilohm resistor 142 to the output terminal of a positive 20-volt regulated source.

A string of resistors 144, 146 and 148 having respective values of 4.7 kilohms, 33 kilohms and 4.7 kilohms are connected between the positive and negative outputs of the positive and negative 20-volt sources. The junction of the resistor 144 and 146 is connected to the base of the transistor 140, whereas the junction of the resistors 146 and 148 is connected to the base of the transistor 136. This circuit functions as a current control circuit, so as to assure that invariable currents are used to excite the transistors 128, 130, 132 and 134 in the comparator "B." The field effect transistors 132 and 134 provide a high input impedance to the comparator circuit, so that the loading on the two inputs will be reduced to a negligible level.

The transistors 128 and 130 have their base electrodes connected to the respective drain electrodes of the field effect transistor 132 and 134, and to the output terminal of the positive 20-volt source through respective resistors 150 and 152, each having a resistance, for example, of 15 kilohms. The collectors of the transistors 128 and 130 are connected to respective grounded resistors 154 and 156. These resistors may each have a value of 10 kilohms. The collector of the transistor 128 is also connected to the base of an NPN relay drive transistor 160. The collector of the transistor 160 is connected to the energizing coil of relay K4. The emitter of the transistor 160 is grounded.

The field effect transistors 132 and 134 may be included in an integrated circuit of the type presently designated SU2080. The PNP transistors 128, 130 and 140 may be of the type presently designated 2N3638. The relay drive transistor 160 may be of the type presently designated 2N3417, as may the transistor 136.

The circuit of the comparator "B" operates so that an energizing current flows through the transistor 160, when the comparison point between the signals applied to the input terminals "A" and "B" is reached. The comparator operates as a usual differential amplifier, and a detailed explanation of its function is deemed to be unnecessary. As noted above, the comparator "A" may have a similar circuit.

The analog memory capacitor 40, as shown in FIG. 2, is connected to the input terminal "B" of the comparator "B." The input impedance of the comparator, due to the field effect transistor 132, is sufficiently high so that no appreciable leakage from the memory capacitor 40 occurs during the test.

The system and apparatus described, therefore, is capable of providing a direct reading corresponding to the difference in the optical densities of a pair of test samples. It will be appreciated, of course, that modifications may be made, and the following claims are intended to cover such modifications.

What we claim is:

1. An electronic digitizing converter system and apparatus for producing output readings representative of the difference between first and second analog input signals, said system and apparatus including: a source of electrical pulses having a predetermined repetition frequency; counter means responsive to said pulses for providing readings corresponding to the number of pulses applied thereto; first and second signal comparator means; memory means coupled to said first signal comparator means; input circuit means coupled to said memory means and to said second comparator means for respectively introducing said first and second analog signals to said memory means and to said second signal comparator means; exponential ramp signal generating means coupled to said first and second signal comparator means for introducing a ramp signal to said first and second comparator means; and control circuit means coupled to said first and second signal comparator means and interposed between said source and said counter means, said control circuit means being responsive to output signals from said first and second comparator means for initiating the application of pulses from said source to said counter when said ramp signal reaches a predetermined relationship with respect to one of said analog input signals and for terminating the application of said pulses to said counter when said ramp signal reaches a predetermined relationship with the other of said input signals.

2. The system and apparatus defined in claim 1 in which said control circuit means initiates the application of pulses from said source to said counter when said ramp signal reaches a predetermined relationship with respect to said first analog signal stored in said memory and for terminating the application of said pulses to said counter when said ramp signal reaches a predetermined relationship with respect to said second analog input signal.

3. The system and apparatus defined in claim 1 in which said first comparator means has a high input impedance, and said memory comprises a capacitor coupled to the input of said first comparator means.

4. The system and apparatus defined in claim 1 in which said ramp signal-generating means produces an exponentially decreasing ramp signal.